(12) United States Patent
Mueller et al.

(10) Patent No.: US 9,772,743 B1
(45) Date of Patent: Sep. 26, 2017

(54) IMPLEMENTATION OF A MOVABLE CONTROL PAD ON A TOUCH ENABLED DEVICE

(71) Applicant: Electronic Arts Inc., Redwood City, CA (US)

(72) Inventors: Timo Mueller, Vancouver (CA); Young Tae Son, Vancouver (CA)

(73) Assignee: ELECTRONIC ARTS INC., Redwood City, CA (US)

( * ) Notice: Subject to any disclaimer, the term of this patent is extended or adjusted under 35 U.S.C. 154(b) by 133 days.

(21) Appl. No.: 14/750,894

(22) Filed: Jun. 25, 2015

Related U.S. Application Data

(60) Provisional application No. 62/140,311, filed on Mar. 30, 2015.

(51) Int. Cl.
| | |
|---|---|
| *G06F 3/041* | (2006.01) |
| *G06F 3/0481* | (2013.01) |
| *G06F 3/0484* | (2013.01) |
| *G06F 3/0488* | (2013.01) |
| *A63F 13/2145* | (2014.01) |

(52) U.S. Cl.
CPC ...... *G06F 3/04812* (2013.01); *A63F 13/2145* (2014.09); *G06F 3/04842* (2013.01); *G06F 3/04845* (2013.01); *G06F 3/04886* (2013.01); *G06F 2203/04803* (2013.01)

(58) Field of Classification Search
CPC . A63F 9/24; A63F 13/00; G06F 17/00; G06F 19/00; G06F 3/033; G06F 3/02; G06F 3/041; G06F 3/045; G06F 3/042; G06F 3/043; G06F 3/037; G09G 5/08; G09G 5/00; G09G 1/00; G01R 27/26
See application file for complete search history.

(56) References Cited

U.S. PATENT DOCUMENTS 9,104,308 B2 * 8/2015 Au ...................... G06F 3/04883
2007/0236475 A1 * 10/2007 Wherry ................ G06F 3/0485
345/173

(Continued)

OTHER PUBLICATIONS

YouTube Video: Geometry Wars Touch for iPad, retrieved from https://www.youtube.com/watch?v=JunHFvBIQ2E, uploaded on Apr. 3, 2010, transcript as accessed on Sep. 9, 2015, 0:00-3:23, with 11 screenshots, 13 pages.

*Primary Examiner* — Pegeman Karimi
(74) *Attorney, Agent, or Firm* — Knobbe, Martens, Olson & Bear LLP

(57) ABSTRACT

A control pad displayed on a touchscreen of a touchscreen device can be used by a user to control or manipulate characters, objects, or entities within a game environment. In some embodiments, the control pad is activated and displayed at a location of the touchscreen based at least in part on a touch signal location within a defined partition of the touchscreen. In response to the touch signal being moved within the boundary of the control pad, an action or manipulation of the game environment may be performed based at least in part on the location of the touch signal relative to the control pad. In some embodiments, if the touch signal is moved outside the boundary of the control pad, the position of the control pad is adjusted such that the location of the touch signal remains on or within the boundary of the control pad.

17 Claims, 9 Drawing Sheets

(56) References Cited

U.S. PATENT DOCUMENTS

2010/0302155 A1* 12/2010 Sands .................... G06F 3/042
345/163
2011/0172013 A1* 7/2011 Shirasaka ............. G06F 3/0488
463/37

* cited by examiner

IMPLEMENTATION OF A MOVABLE CONTROL PAD ON A TOUCH ENABLED DEVICE

RELATED APPLICATIONS

This application claims priority to U.S. Provisional Application No. 62/140,311, filed on Mar. 30, 2015 and titled "IMPLEMENTATION OF A MOVABLE CONTROL PAD ON A TOUCH ENABLED DEVICE," which is hereby incorporated herein by reference in its entirety.

BACKGROUND

Generally, in video games, a user can manipulate a physical input device, such as a game controller, keyboard, joystick, mouse, and/or other input device in order to interact with the video game. The physical input device can include buttons, joysticks, control pads, and other types of control elements that can be manipulated to control the operation of characters, objects, and/or entities within a game environment. The rise in popularity of mobile devices, such as, for example, smartphones, tablets, and the like, along with advances in touchscreen technology, have provided a growing market for touchscreen enabled game applications. In order to control or manipulate the game environment without a physical input device, many touchscreen-enabled game applications attempt to emulate the physical control elements with virtual control elements displayed on the touchscreen. The virtual control elements can be manipulated with touch inputs in a manner similar to their physical counterparts.

SUMMARY OF EMBODIMENTS

The systems, methods and devices of this disclosure each have several innovative aspects, no single one of which is solely responsible for the desirable attributes disclosed herein. Details of one or more implementations of the subject matter described in this specification are set forth in the accompanying drawings and the description below.

In one embodiment, a system is disclosed. The system may comprise a first physical data store configured to store game environment information and a computing device in communication with the first physical data store. The computing device may be configured to receive a touch signal, the touch signal indicating a first location on the touchscreen. In response to the received touch signal, the computing device may cause the touchscreen to display the control pad in a first position, based at least in part on the first location, wherein the control pad comprises a control area on the touchscreen circumscribed by a boundary, and wherein the first location is within the control area. In addition, the computing device may receive an indication of a movement of the touch signal from the first location to a second location, wherein the second location is outside the boundary of the control pad, and in response to movement of the touch signal from the first location to the second location, cause a manipulation to be performed in a game environment, based at least in part on the movement of the touch signal relative to the first position of the control pad, and cause the control pad to be updated from the first position on the touchscreen to a second position based, at least in part, on the second location of the touch signal, such that the second location is within the boundary of the control pad.

In another embodiment, a computer-implemented method is disclosed. The method may be implemented by one or more computing devices configured with specific computer-executable instructions to include receiving a touch signal, the touch signal indicating a first location on the touchscreen. In response to the received touch signal, the method may further comprise causing the touchscreen to display the control pad in a first position, based at least in part on the first location, wherein the control pad comprises a control area on the touchscreen circumscribed by a boundary, and wherein the first location is within the control area. In addition, the method may comprise receiving an indication of a movement of the touch signal from the first location to a second location, wherein the second location is outside the boundary of the control pad, and in response to movement of the touch signal from the first location to the second location, causing a manipulation to be performed in a game environment, based at least in part on the movement of the touch signal relative to the first position of the control pad, and causing the control pad to be updated from the first position on the touchscreen to a second position based, at least in part, on the second location of the touch signal, such that the second location is within the boundary of the control pad.

In yet another embodiment, a non-transitory computer readable medium is disclosed. The non-transitory computer readable medium may comprise computer-executable instructions that, when executed by a computer, cause the computer to perform a method for implementing a control pad on a touchscreen. The method may comprise receiving a touch signal, the touch signal indicating a first location on the touchscreen, and, in response to the received touch signal, causing the touchscreen to display the control pad in a first position, based at least in part on the first location, wherein the control pad comprises a control area on the touchscreen circumscribed by a boundary, and wherein the first location is within the control area. The method may further comprise receiving an indication of a movement of the touch signal from the first location to a second location, wherein the second location is outside the boundary of the control pad, and, in response to movement of the touch signal from the first location to the second location, causing a manipulation to be performed in a game environment, based at least in part on the movement of the touch signal relative to the first position of the control pad, and causing the control pad to be updated from the first position on the touchscreen to a second position based, at least in part, on the second location of the touch signal, such that the second location is within the boundary of the control pad.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Overview

Figure 1:
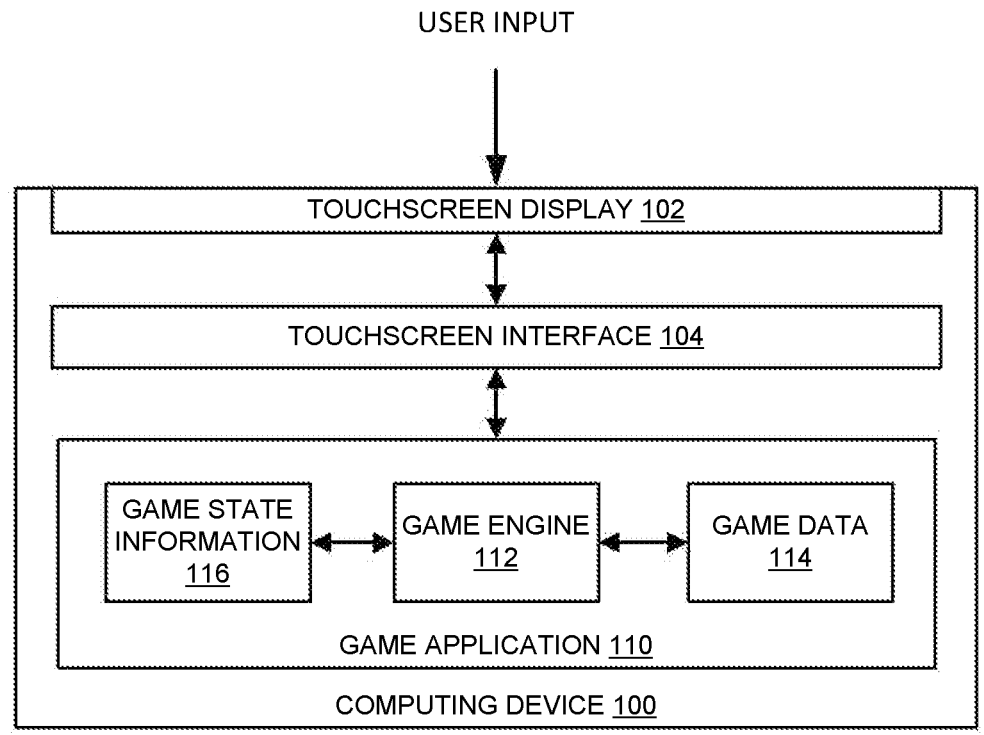
FIG. 1 illustrates an embodiment of a touchscreen game system.

Embodiments of the present disclosure provide systems and methods for the display and operation of control elements on a touchscreen device. The control elements do not need to be constrained to an existing physical configuration, such as on a traditional game controller or keyboard. Some embodiments of traditional game controllers (for example, a console game controller, a keyboard and mouse, or other game controllers) can provide tactile feedback due to the different shapes and texture of the control elements (for example, buttons, control pads, joysticks, and/or the like). The tactile nature of physical controllers can help a user ascertain the position of their fingers are on the desired control elements, allowing the user to effectively manipulate the controller and, in turn, control the game without having to look directly at their hands. However, control elements on a touchscreen device may not provide feedback when manipulated on the touchscreen. Thus, it may be difficult for a user using touchscreen controls to ascertain whether or not his fingers are on the correct area of the touchscreen without having to look away from the game and at his hands. This can make gaming on touchscreen devices less convenient and engaging for the user. For example, when a user's finger unintentionally move away from a touch screen control, the application can miss inputs that the user intended to provide to the application.

Thus, there exists a need for touchscreen gaming controls able to follow the user's hands of finger, allowing the user to continue to use the control pad even if their fingers move slightly off the area of the touchscreen where the control pad is originally displayed. This makes it so that users can play the game without having to frequently look away from the game to check the position of their hands, which can increase engagement and enjoyment of the game.

In some embodiments of the present disclosure, a control pad comprising a control area within a defined boundary can be displayed on a touchscreen device. The control pad can be used by a user to control or manipulate characters, objects, or entities within a game environment. In some embodiments, the control pad is activated and displayed at a location of the touchscreen based at least in part on a touch signal location within a partition of the touchscreen. In response to the touch signal being moved within the boundary of the control pad (for example, the user moving a finger to a different location within the control area of the control pad), an action or manipulation of the game environment is performed based at least in part on the location of the touch signal relative to the control pad. In some embodiments, if the touch signal is moved outside the boundary of the control pad, the position of the control pad is adjusted such that the location of the touch signal remains on or within the boundary of the control pad, allowing the user to continue to use the control pad even if the user's finger moves outside the boundary of the control pad.

Although this disclosure focuses on videogames, it should be understood that embodiments described herein can be used with other types of software applications that utilize touch-based control systems. For example, an application that positions elements in three-dimensional space or navigates in a virtual environment may use one or more embodiments of the present disclosure. Such as, for example, a global positioning device interface, a computer aided drawing application, or video editing application.

Overview of a Touchscreen Game System

FIG. 1 illustrates an embodiment of a touchscreen computing device 100, also referred to as a gaming system. The computing device 100 includes a touchscreen display 102 and a touchscreen interface 104, and is configured to execute a game application 110. The computing device 100 can include one or more processors, such as central processing units (CPUs), graphics processing units (GPUs), and data storage combined or in separate elements. In some embodiments, the computing device 100 can be a specialized computing device created for the purpose of executing game applications 110. The game applications 110 executed by the computing device 100 may be created using a particular application programming interface (API) or compiled into a particular instruction set that may be specific to the computing device 100. In some embodiments, the computing device 100 may be a general purpose computing device capable of executing game applications 110 and non-game applications. For example, the computing device 100 may be a laptop with an integrated touchscreen display or desktop computer with an external touchscreen display. Components of an example embodiment of a computing device 100 are described in more detail with respect to FIG. 5.

The touchscreen display 102 can be capacitive touchscreen, a resistive touchscreen, surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 102. The touchscreen interface 104 can be configured to translate the touch input into data and output the data such that it can be interpreted by components of the computing device 100, such as an operating system and the application 110. The touchscreen interface 104 can translate characteristics of the tactile touch input touch into touch input data. Example characteristics of a touch input can include, shape, size, pressure, location, direction, momentum, duration, and/or other characteristics. The touchscreen interface 104 can be configured to determine the type of touch input, such as, for example a tap (for example, touch and release at a single location) or a swipe (for example, movement through a plurality of locations on touchscreen in a single touch input). The touchscreen interface 104 can be configured to detect and output touch input data associated with multiple touch inputs simultaneously. The touchscreen interface 104 can be configured to detect movement of the touch inputs. The touch input data can be transmitted to components of the computing device 100 for processing. For example, the touch input data can be transmitted directly to the application 110 for processing.

In some embodiments, the touch input data can undergo processing and/or filtering by the touchscreen interface 104, an operating system, or other components prior to being output or provided to the game application 110. As one example, raw touch input data can be captured from a touch input. The raw data can be filtered to remove background noise, pressure values associated with the input can be measured, and location coordinates associated with the touch input can be calculated. The type of touch input data provided to the game application 110 can be dependent upon the specific implementation of the touchscreen interface 104 and the particular API associated with the touchscreen interface 104. In some embodiments, the touch input data can include location coordinates of the touch input. The touch signal data can be output at a defined frequency. Processing the touch inputs can be computed many times per second and the touch input data can be output to the game application for further processing.

A game application 110 can be configured to be executed on the computing device 100. The game application 110 may also be referred to as a videogame, a game, game code and/or a game program. A game application should be understood to include software code that a computing device 100 can use to provide a game for a user to play. A game application 110 may comprise software code that informs a computing device 100 of processor instructions to execute, but may also include data used in the playing of the game, such as data relating to constants, images and other data structures. For example, in the illustrated embodiment, the game application includes a game engine 112, game data 114, and game state information 116.

The touchscreen interface 104 or another component of the computing device 100, such as the operating system, can provide data representing user input, such as touch inputs, to the game application. In some embodiments, the computing device 100 may include additional user input devices, such as a mouse, a keyboard, a camera, a game controller, or the like. The game engine 112 can be configured to execute aspects of the operation of the game application 110 within the computing device 100. Execution of aspects of gameplay within a game application can be based, at least in part, on the user input received, the game data 114, and game state information 116. The game data 114 can include game rules, prerecorded motion capture poses/paths, environmental settings, constraints, skeleton models, and/or other game application information.

The game engine 112 can execute gameplay within the game according to the game rules. Examples of game rules can include rules for scoring, possible inputs, actions/events, movement in response to inputs, and the like. Other components can control what inputs are accepted and how the game progresses, and other aspects of gameplay. During execution of the game application 110, the game application 110 can store game state information 116, which can include a game state, character states, environment states, scene object storage, and/or other information associated with a state of execution of the game application 110. For example, the game state information 116 can identify the state of the game application at a specific point in time, such as a character position, character action, game level attributes, and other information contributing to a state of the game application. The game state information can include dynamic state information that continually changes, such as character movement positions, and static state information, such as the identification of a game level within the game.

The game engine 112 can receive the user inputs and determine in-game events, such as actions, collisions, runs, throws, attacks and other events appropriate for the game application 110. During operation, the game engine 112 can read in game data 114 and a game state information 116 to determine the appropriate in-game events. In one example, after the game engine 112 determines the character events, the character events can be conveyed to a movement engine that can determine the appropriate motions the characters should make in response to the events and passes those motions on to a physics engine. The physics engine can determine new poses for the characters and provide the new poses to a skinning and rendering engine. The skinning and rendering engine, in turn, can provide character images to an object combiner in order to combine animate, inanimate, and background objects into a full scene. The full scene can be conveyed to a renderer, which generates a new frame for display to the user. The process can repeated for rendering each frame during execution of the game application. Though the process has been described in the context of a character, the process can be applied to any process for processing events and rendering the output for display to a user.

Movable Control Pad

Figure 2A:
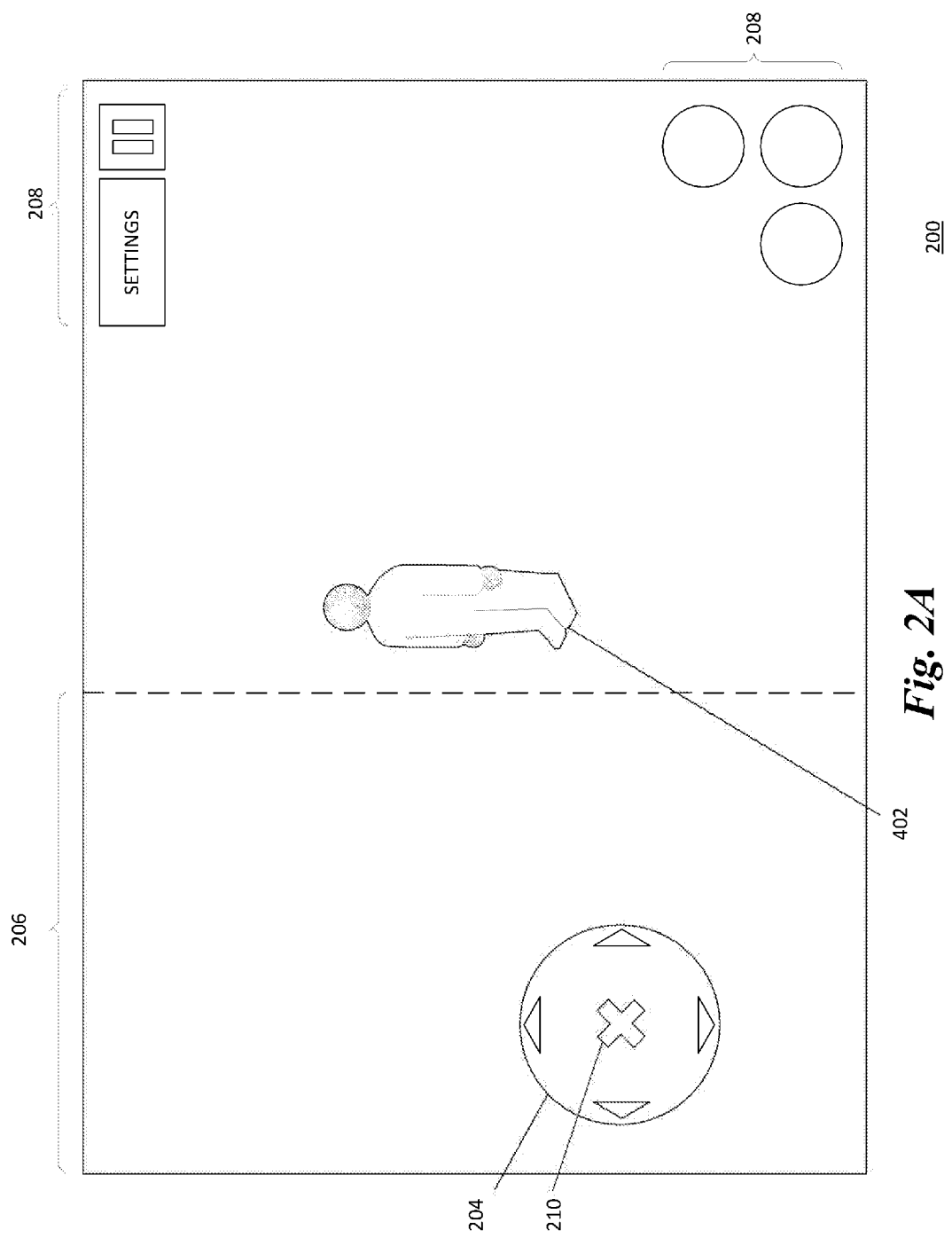
FIGS. 2A-C illustrate embodiments of a screen of a touchscreen device that implements a movable control pad in accordance with some embodiments.
Figure 2B:
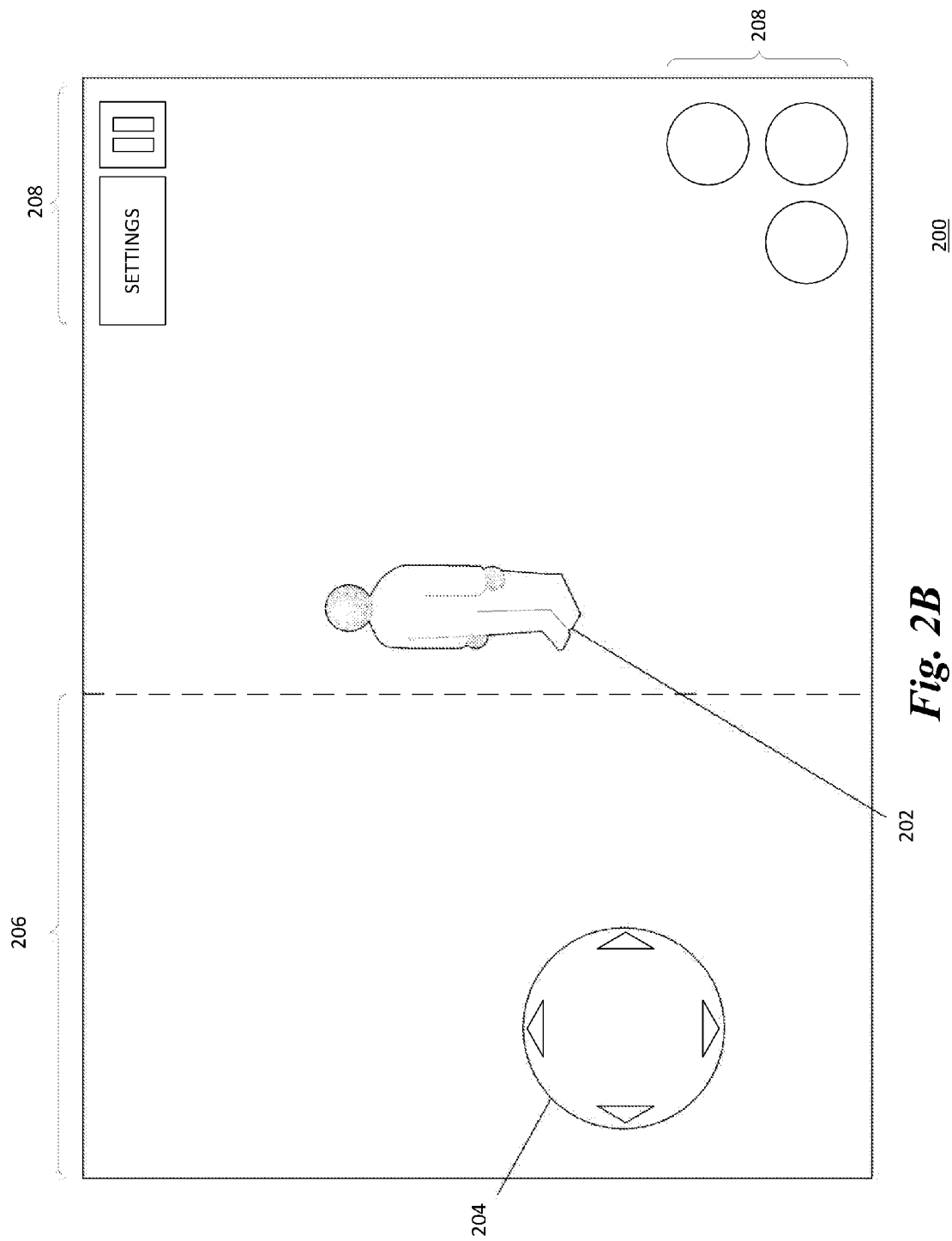
Figure 2C:
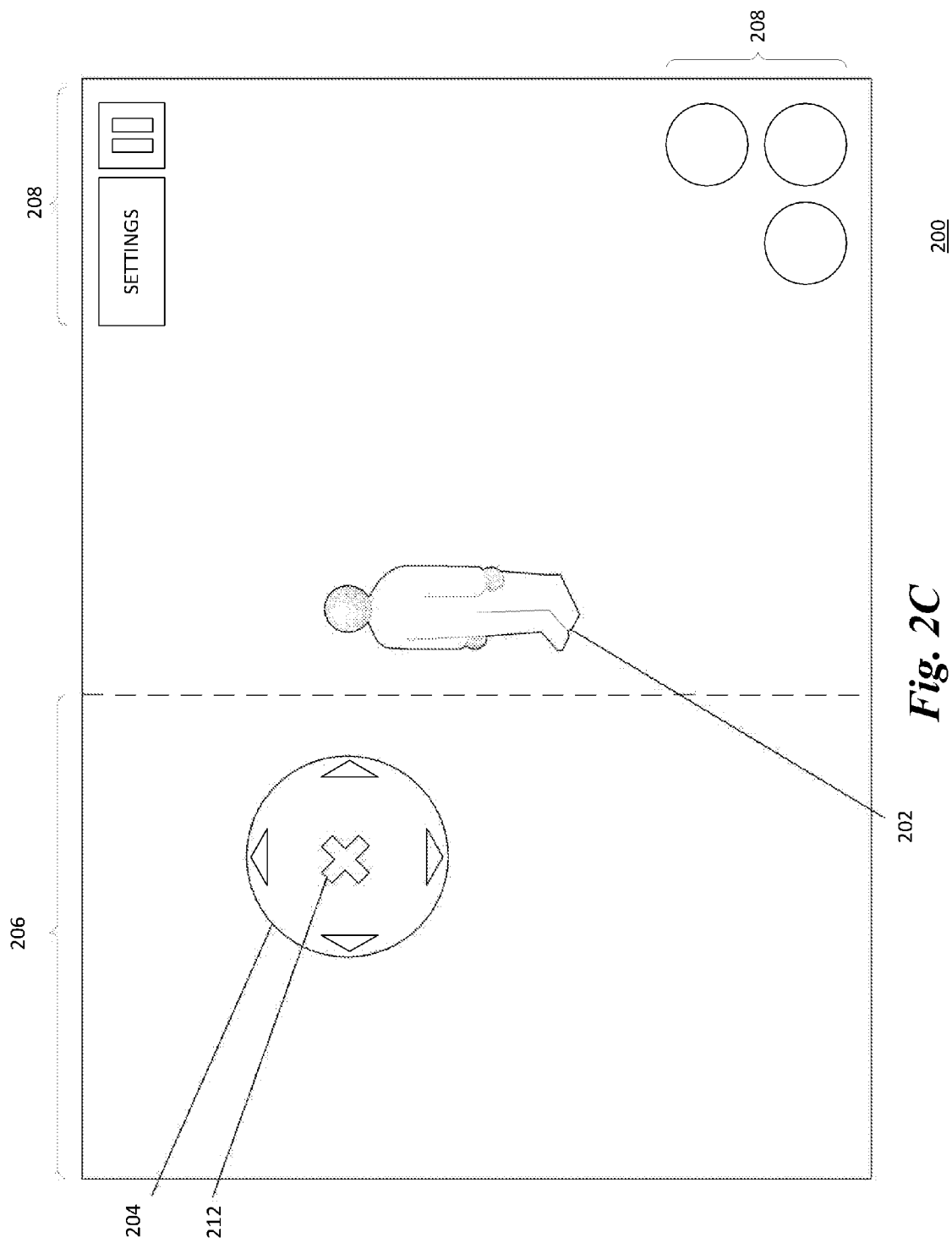

FIGS. 2A-C illustrate embodiments of a screen of a touchscreen device that implements a movable control pad in accordance with some embodiments. The touchscreen device may correspond to any type of device having a display screen that allows for tactile inputs from a user through the display screen, such as a smartphone, tablet computer, handheld gaming system, controller associated with a gaming console, laptop computer, or personal computer system, automobile console, and/or the like.

As used in the present specification, a touch signal may correspond to any type of tactile input that may be received by a touchscreen device. For example, a touch signal may be generated by a user touching a touchscreen of a touchscreen device using one or more fingers. In some embodiments, a touch signal may be generated in other ways, such as by using a stylus or pointing device.

As illustrated in FIG. 2A, screen 200 may display a gaming environment containing a character, object, or other type of entity 202 (hereinafter, referred to as character 202) associated with the game that may be controlled by the user using the one or more control means (for example, one or more buttons, a control pad, and/or the like). For example, in some embodiments, a control pad may be used by a user to navigate the character 202 through a two or three-dimensional environment, while one or more buttons may be used to allow the character to perform various actions (for example, punch, kick, jump). For example, the game engine 112 may receive touch signal data from touchscreen interface 104, and control the character 202 based at least in part on the received touch signal data. In some embodiments, instead of or in addition to the character 202, the control pad, buttons, and/or other control elements may be used by the user to interact with other elements of the application (for example, menus, other objects in the game environment, and/or the like).

Screen 200 may display one or more buttons 208 or user interface elements that may be manipulated by the user based on received touch signals. For example, the screen may display a pause button that allows the user to pause the game, and a settings button that, when manipulated by the user, displays a settings menu allowing the user to view and/or change game settings. For example, settings may comprise display options for the game, control options for the game, and/or the like.

In addition, buttons 208 may include one or more gameplay buttons. For example, pressing a gameplay button may cause an action to be performed by character 202 in the game environment. In some embodiments, the buttons displayed on the screen may move or change based at least in part on a game mode of the game. For example, a first set of buttons may be displayed in connection with a first game mode, while a second set of buttons may be displayed in connection with a second game mode. In some embodiments, a touchscreen device may also include physical buttons, which may also be used to manipulate or control the game and/or game environment.

In some embodiments, a control pad 204 may be displayed on screen 200, that can be used to control or manipulate character 202 and/or other aspects of the gaming environment. The control pad 204 may have a particular shape defining a control area within a defined boundary on screen 200. For example, in the illustrated embodiment, the control pad 204 is substantially circular in shape, defining a circular control area within a circular boundary on screen 200. It is understood that in other embodiments, the control pad 204 may define differently shaped control areas (for example, a rectangular shape, a cross shape corresponding to a directional pad allowing for four different directional inputs, and/or the like). The control areas may be located in different areas of the screen based on the application and/or the user.

For purposes of illustrating this example, the control pad 204 is referred to as being configured to be used by the user to control a movement of character 202 in the gaming environment displayed on screen 200. The game engine 112 can determine a command based on the location of the touch input within the control area of the control pad. For example, in response to a touch signal on the left side of the control area of the control pad 204, the character 202 may be caused to move in a leftward direction. It is understood that in other embodiments, control pad 204 may be used to control or manipulate a variety of different elements in the game environment in different ways.

In some embodiments, the screen 200 may include a plurality of partitions. The control pad 204 may be configured to be displayed within a defined partition on the touchscreen 200. In the illustrated embodiment, the control pad 404 is displayed within the partition 206 on the left side of screen 200, although it is understood that in other embodiments, the control pad may be configured to be displayed in another designated partition 206. Additionally, the partition may correspond to any region within screen 200. In some embodiments, a size or shape of the partition 206 may be configured by a user through the game's settings.

In some embodiments, when the game is first initialized, the control pad 204 may be displayed in a default position within the partition 206. Alternatively, the control pad 204 is not displayed until an indication of a touch signal within the partition 206 of the touchscreen, or some other indication requesting the control pad (for example, the push of a "start" button) is received. In some embodiments, the game's settings may be configured by the user to specify whether or not control pad 204 is to be displayed prior to the receipt of a touch signal within partition 206 or otherwise requesting the control pad.

FIG. 2A illustrates the touchscreen 200 when a touch signal is received at a location 210 within the partition 206. In response to the receipt of a touch signal on screen 200 at location 210, the control pad 204 can be displayed at a position based at least in part on location 210. For example, control pad 204 may be displayed such that it is centered or substantially centered upon location 210. In some embodiments, if location 210 of the received touch signal is close enough to a boundary of partition 206 such that there is not enough room for control pad 204 to be centered upon location 210 and still be displayed entirely within partition 206, then control pad 204 may be displayed at a position that is off-center from location 210, such that it is able to be displayed entirely within partition 206.

In some embodiments, if control pad 204 is already displayed (for example, in a default position), and touch signal location 210 is within the boundary of the control pad 204, then a movement or manipulation of character 202 may be performed, based at least in part on the location 210 within the control area of the control pad 204. In some embodiments, the movement or manipulation may be performed by game engine 112, as illustrated in FIG. 1, subject to game data 114 and/or game state 116.

In some embodiments, if the touch signal is received at a location of the screen that is outside partition 206, then control pad 204 is not displayed, or, if already displayed, continue to be displayed at its previous position. In some embodiments, the screen 200 may be configured so that regions outside of the partition 206 respond differently to touch signals. For example, a touch signal outside the partition 206 may trigger the character to perform various actions (for example, punch, kick, jump). In some embodiments, multiple control pads can be displayed in different partitions that control different aspects of the gameplay. For example, a left and right control pad can be used, with each control pad implementing the functionality described herein.

FIG. 2B illustrates the screen after the touch signal has stopped being received on screen 200 (for example, the user lifts their finger or the stylus such that it no longer touches the screen), in accordance with some embodiments. In the illustrated embodiment, the control pad 204 remains in the same position where it was previously displayed. It is understood that in other embodiments, control pad 204 may disappear after it has been determined that the touch signal has been removed. In some embodiments, a visual effect may be applied on control pad 204 (for example, the control area may be grayed out, made translucent, and/or the like) to indicate the absence of a touch signal within the partition 206.

In some embodiments, control pad 204 may, after it has been determined that the touch signal has been removed, continue to be displayed for a specified period of time before disappearing or being subject to a visual effect. If the touch signal is received within a specified time period (for example, due to a user tapping the touchscreen resulting in the rapid removal and receipt of a touch signal), the control pad 204 may maintain the same visual representation and position without repositioning after the receipt of each touch signal. In some embodiments, the receipt of the touch signal within the specified time period may cause an action to be performed in the game environment (for example, trigger character 202 to perform a specified action).

FIG. 2C illustrates the screen 200 after a touch signal is received within partition 206 at a new location 212. In response to the touch signal being detected at location 212, control pad 204 is activated and displayed at a position based at least in part on location 212 (for example, centered about location 412).

In some embodiments, the control pad 204 continues to be displayed after it is determined that the touch signal has been removed from screen 200 within partition 206. If the new location 212 is within the boundary of control pad 204, then control pad 204 may remain in the same position and a movement or manipulation of character 202 may be performed, based at least in part on the location 212 relative to the position of the control pad 204.

Figure 3A:
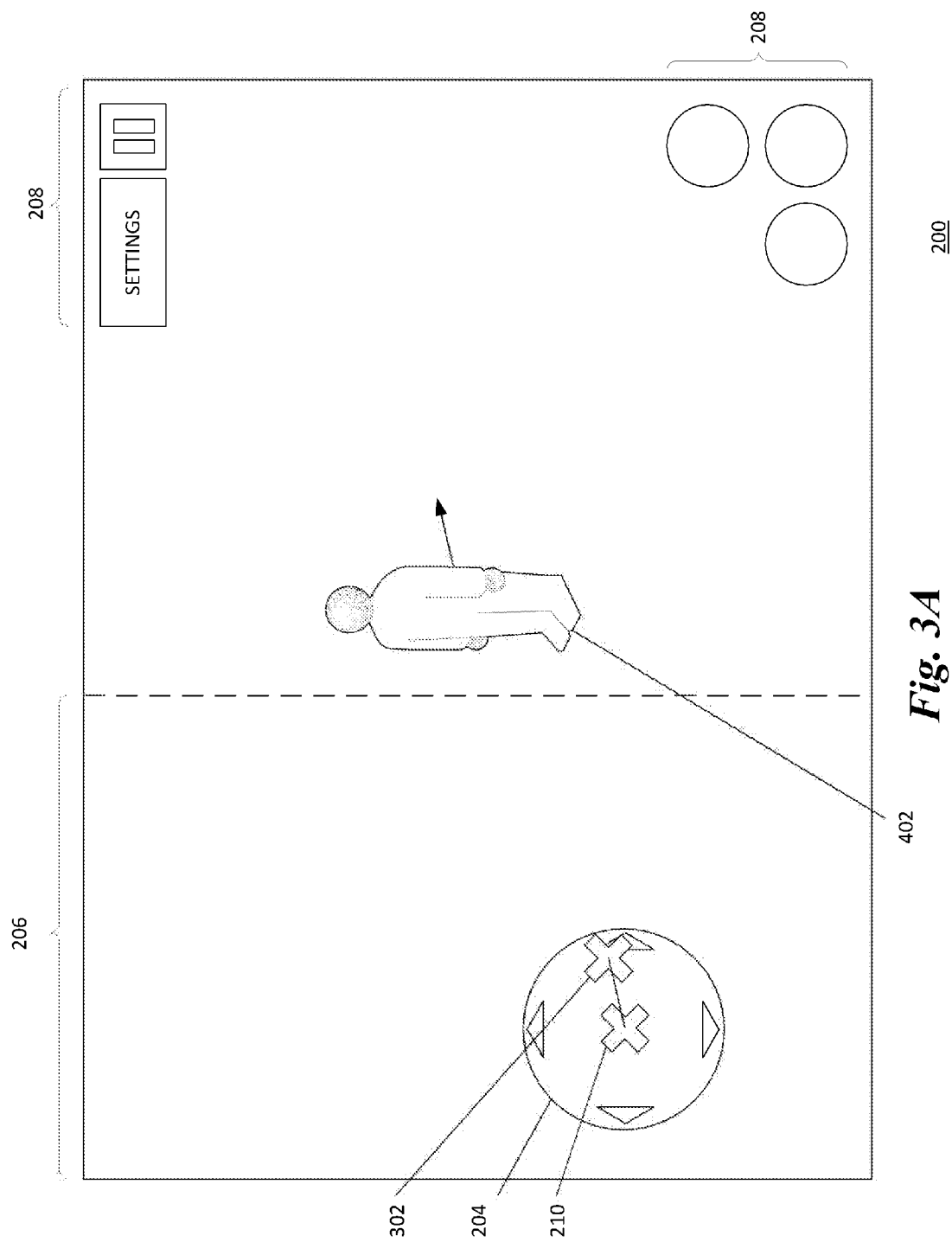
FIGS. 3A-C illustrate embodiments of a screen of a touchscreen device that implements a movable control pad, wherein the location of the touch signal is moved by the user, in accordance with some embodiments.
Figure 3B:
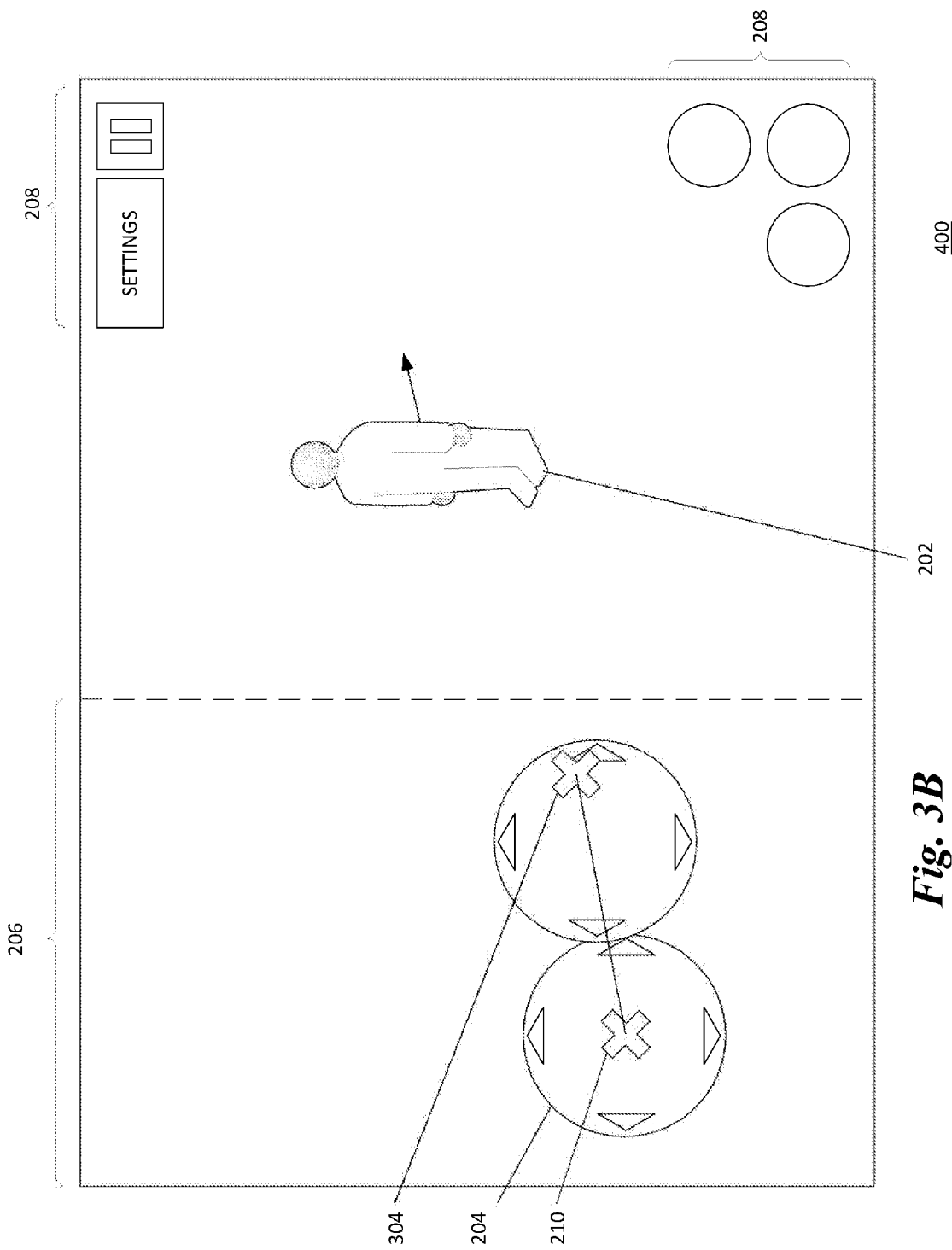
Figure 3C:
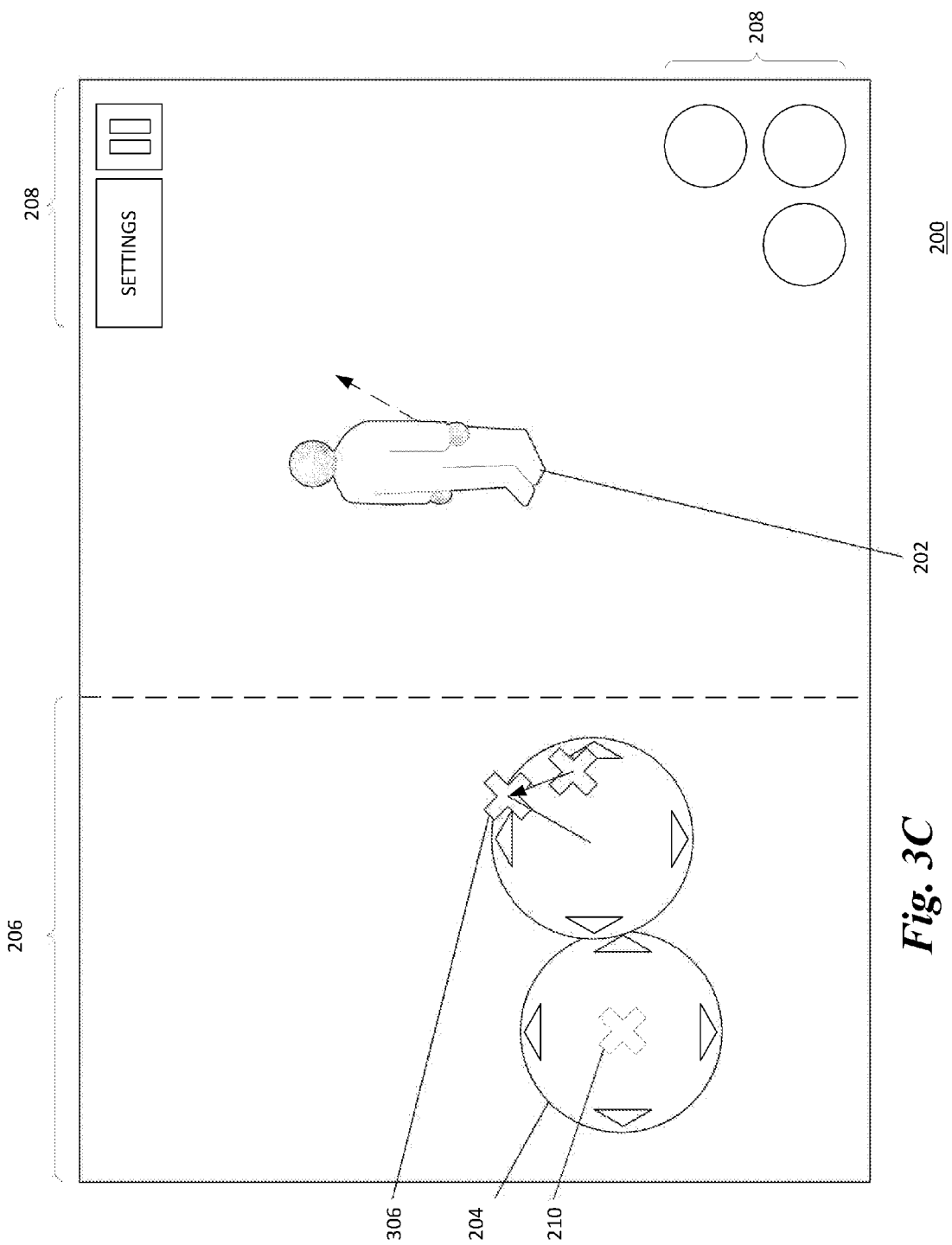

FIGS. 3A-C illustrate embodiments of a screen of a touchscreen device that implement a movable control pad, wherein the location of the touch signal is moved by the user, in accordance with some embodiments. In some embodiments, a movement is determined by periodically determining the presence and location of a touch signal. If the location of the touch signal changes by at least a threshold amount between periods, then it may be determined that a movement of the touch signal has occurred. Additional attributes associated with the touch signal, such as movement speed, movement path, movement direction, and the like may also be determined. In some embodiments, the movement may be determined by game engine 112. In other embodiments, the movement may be determined by another module associated with the touchscreen device, such as the touchscreen interface 104 or operating system, and then sent to game engine 112.

As illustrated in FIG. 3A, when an indication is received of a movement of the touch signal from a first location 210 to a second location 302 that is within the boundary of the control pad 204, the control pad 204 can stay in its original position, and a movement or manipulation of character 202 may be performed, based at least in part on the location 302 of the touch signal within the control area on the control pad 404. For example, character 402 may be moved in a direction corresponding to a position of touch signal location 302 relative to a designated point within the control area of control pad 204 (for example, a direction from the center of the control area of control pad 204 to touch signal location 302). In addition, in some embodiments, a rate of movement of character 202 may be proportional to a distance between touch signal location 302 and the designated point within the control area of control pad 204. In some embodiments, the direction of movement of character 202 may be constrained to one or more predetermined directions. For example, control pad 204 may only have four different available directions (for example, up, down, left, and right), and the movement direction of character 202 may be constrained in those directions. In addition, the movement direction and/or movement rate may be constrained by other elements in the game environment (for example, obstacles in the game environment preventing movement in certain directions) as defined by a game state 116 and game rules, including, for example, character states, scene objects, and/or constraints.

FIG. 3B illustrates the screen wherein the touch signal is determined to have moved to a location outside the boundary of control pad 204. As the touch signal location crosses the boundary of control pad 204, control pad 204 may be updated such that it appears to move (or be "dragged") in a direction corresponding to a direction of movement of the touch signal location, such that the touch signal location remains on or within the boundary of control pad 204.

In some embodiments, control pad 204 is dragged such that the location 304 of the touch signal remains in substantially the same location in the control area relative to the boundary of the control pad 204. For example, if it is determined that the touch signal moved in a rightward direction from the center of control pad 204 to a point outside the boundary of control pad 204, control pad 204 may be dragged such that touch signal location 304 remains in substantially the same location within the control area, on the right side of control pad 204, and can provide the same input to the game application. This may result in the continued movement of character 202 in the same direction as when touch signal location 304 crossed the boundary of control pad 204 during the detected movement (for example, to the right).

In some embodiments, the position of the touch signal location relative to control pad 204 as control pad 204 is being dragged may change if the movement direction of the touch signal location changes. For example, if it is determined that the location of the touch signal moves to the right and then upwards, control pad 204 may be dragged such that the relative position of the touch signal location to control pad 204 will shift upwards. In some embodiments, how the position of the touch signal location relative to the updated control pad 204 changes may be based at least in part on a deviation from a movement path of the touch signal at a location near where the touch signal approached or crossed the boundary of the control pad. In addition, the movement of character 202 may also change accordingly based at least in part on the changed relative position of the touch signal location to control pad 204. In some embodiments, the position of the control pad is continuously updated as the location of the touch signal crosses or approaches (for example, comes within a threshold distance from) the boundary of the control pad, such that the location of the touch signal remains within the control area. As a movement direction of touch signal location changes, the position of the control pad may be updated accordingly based on the changing location of the touch signal relative to the control area as it crosses or approaches the boundary of the control pad.

FIG. 3C illustrates the screen wherein the location of the touch signal continues to move, but in a different direction such that the touch signal location remains within the boundary of control pad 204. Because touch signal location 306 remains within the boundary of control pad 204, control pad 204 does not move in response to the movement of the touch signal. Instead, movement of character 202 may change based at least in part on the new position of touch signal location 306 to within the control area of control pad 204.

Movable Control Pad Process

Figure 4:
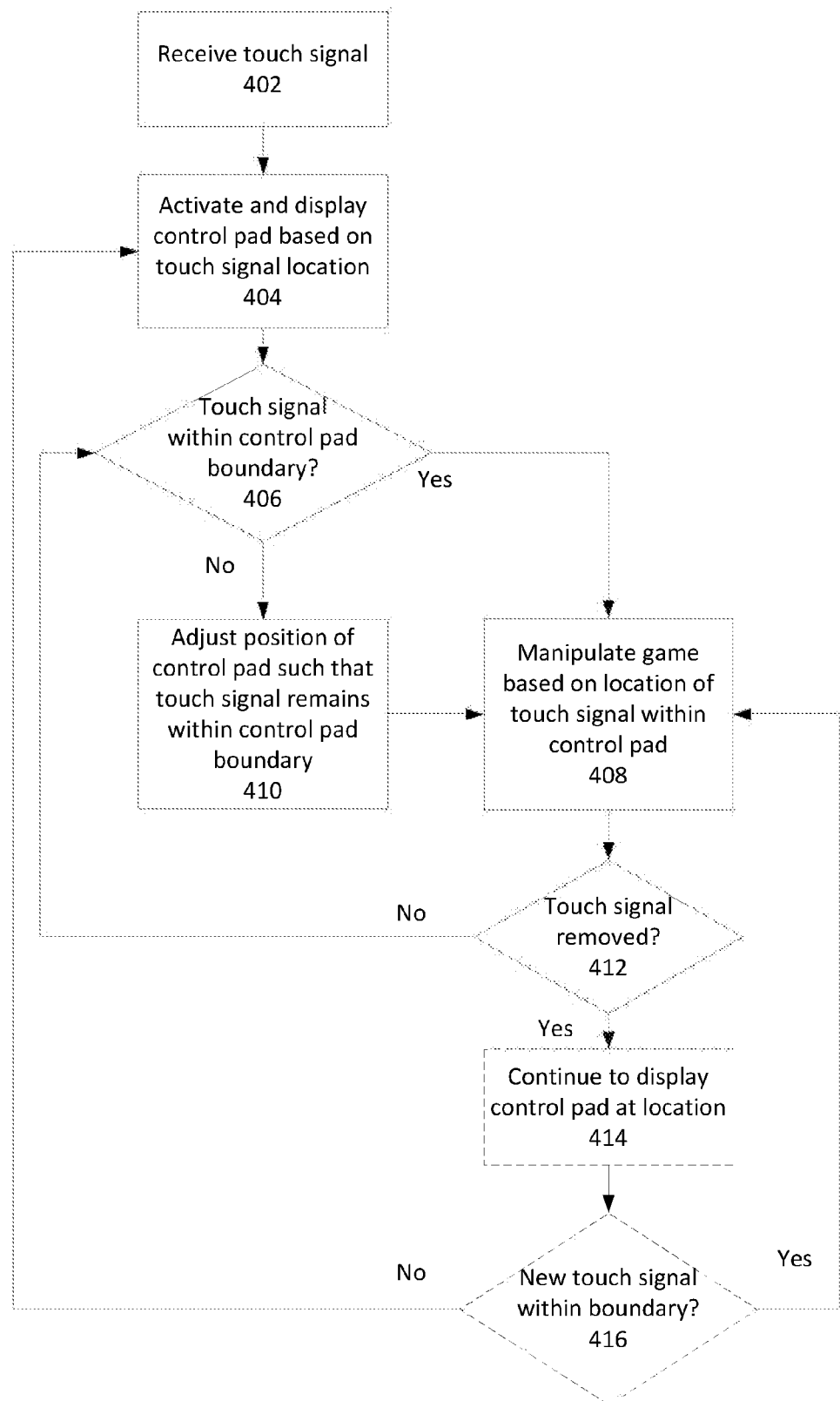
FIG. 4 illustrates one embodiment of a flowchart of a process for implementing a movable control pad on a touchscreen device, in accordance with some embodiments.

FIG. 4 illustrates embodiment of a flowchart of a process 400 for implementing a movable control pad on a touchscreen device, in accordance with some embodiments. The process 400 can be implemented by any system that can process the tracking of touch inputs on a touchscreen. For example, the process 400, in whole or in part, can be implemented by a game engine 112 or the game application 110. Although any number of systems, in whole or in part, can implement the process 400, to simplify discussion, the process 400 will be described with respect to particular systems. Further, although embodiments of the process 400 may be performed with respect to any type of control element within a game application, to simplify discussion, the process 400 will be described with respect to a control pad within the game application 110.

At block 402, a touch signal is received that indicates a location on a touchscreen. The touch signal may be received as a result of a user of the touchscreen device (the user) touching the touchscreen of a touchscreen device with a finger, or with a pointing device such as a stylus. The touch signal can be generated by the touch screen hardware and the touch signal can be provided to the game engine 112 for processing in accordance with the game data 114 and/or game state 116. In some embodiments, the touch signal is at a location that is within a defined partition of the touchscreen, but in other embodiments, the touch signal can be outside the defined partition.

At block 404, a control pad is activated and displayed on the touchscreen device, based at least in part on a location of the touch signal. For example, the control pad may be displayed such that it is centered upon the location of the touch signal. In some embodiments, the control pad is only displayed if the touch signal is within the defined partition of the touchscreen. In some embodiments, if the location of the touch signal is close enough to a boundary of the partition such that the control pad could not be centered upon the location of the touch signal and also be displayed entirely within the partition, then the control pad may be displayed may be displayed off-center from the touch signal location, so that it is displayed entirely within the partition. In other embodiments, the control pad is not displayed entirely within the partition. For example, the control pad may be displayed such that it is centered upon the touch signal location, with at least a portion of the control pad extending outside the partition of the touchscreen.

In some embodiments, if the control pad is already displayed on the touchscreen device (for example, the control pad is displayed in a default location on the touchscreen when the game is initialized), then the control pad may be re-displayed at a position based at least in part on the location of the touch signal (for example, centered on the touch signal location). In some embodiments, the control pad may be re-displayed only if the location of the touch signal is not within a boundary of the displayed control pad.

At block 406, it is determined whether the location of the touch signal remains within the boundaries of the control pad. In some embodiments, this may be done by periodically detecting or receiving indications of a touch signal (for example, whether or not there is a touch signal, and a location of the touch signal if it exists). For example, if the location of the detected touch signal is different between periods, a movement of the touch signal may be determined. In some embodiments, the touch signal location must differ by at least a threshold amount in order for a movement to be determined. On the other hand, if no touch signal is detected, then it may be determined that the touch signal has been removed from the touch screen. In some embodiments, a movement of the touch signal may be determined by game engine 112, while in other embodiments, the movement may be determined using another module associated with the touchscreen device, such as touchscreen interface 104, wherein data relating to the determined movement (for example, start point, end point, movement path, movement direction, movement speed, and/or the like) is then sent to game engine 112.

If it is determined that the touch signal has not moved, or has only moved within the boundary of the control pad, then a manipulation of the game may be performed, based at least in part on the location of the touch signal relative to the control area of the control pad at block 408. In some embodiments, the manipulation may comprise moving a character, object, or selection in a direction corresponding to a direction from a designated point within the control area (for example, a center of the control area) to the touch signal location. For example, the location of the touch signal moving above the center of the control area may cause a game character to move in an upwards direction. In some embodiments, a movement distance or rate may be based at least in part on a distance between the touch signal location and the designated point of the control area.

On the other hand, if it is determined that the touch signal has moved to a location that is outside the boundary of the control pad, the position of the control pad may be adjusted such that the touch signal remains within the boundaries of the control pad at block 410. In some embodiments, this comprises moving or "dragging" the control pad in accordance with the determined movement of the touch signal. In some embodiments, the control pad may be moved such that its position relative to the location of the touch signal remains substantially the same as from where a path of the determined movement of the touch signal crossed the boundary of the control pad. For example, if the touch signal crosses the boundary of the control pad at the right side of the control pad, the control pad may be adjusted to the right, such that the touch signal remains on the right side of the control pad. This may result in the continued command being executed, such as a movement or manipulation, within the game, based at least in part on the location of the touch signal relative to the updated control area of the control pad.

In some embodiments, if it is determined that the direction of movement of the touch signal location curves or changes, the control pad may be moved such that its position relative to the touch signal location changes based at least in part on the curve or changed direction of movement. For example, if the path of the touch signal location is determined to curve upwards, then the control pad may be moved such that the location of the touch signal relative to the position of the control pad shifts upwards. In some embodiments, the shift may be based at least in part on a deviation between a current path or direction of touch signal movement to a path or direction of touch signal movement near a location where the touch signal approached or crossed the boundary of the control pad.

At block 412, it is determined whether the touch signal has been removed. If it is determined that the touch signal has not been removed (for example, the user is still touching the touch screen), then the process may proceed back to block 406. In some embodiments, the process ends when the touch signal is removed. However, in some embodiments, if the touch signal has been removed, then the process proceeds to block 414.

At block 414, the control pad may, in some embodiments, continue to be displayed at its location prior to the removal of the touch signal. In some embodiments, a visual effect (for example, graying out the control area, making the control area translucent) may be applied to the control pad in response to the removal of the touch signal. In other embodiments, the control pad may be removed from display after determination that the touch signal has been removed. In some embodiments, the system may wait for a predetermined period of time after the determination that the touch signal has been removed before applying a visual effect to the control pad or removing the control pad from display.

At block 416, a new touch signal is detected (for example, the user has placed their finger or stylus back within the partition of the touchscreen). If the new touch signal is within the boundary of the control pad (if the control pad is still displayed), then the process may return to block 408, where the game is manipulated based at least in part on the location of the new touch signal relative to the control area of the control pad. In some embodiments, if the new touch signal is detected within a certain period of time from when the touch signal was removed (for example, the user taps the control pad), an additional action may be performed on the game environment.

On the other hand, if the new touch signal is determined to be outside the boundary of the control pad (or if the control pad was removed from display), then the process may return to block 404, where the control pad is activated and displayed based at least in part on the location of the new touch signal.

In other embodiments, other types of actions may be performed in response to receiving a new touch signal. For example, if a visual effect was applied on the control pad (for example, the controlled pad being greyed out) in response to the determination that the touch signal has been removed, a determination that a new touch signal has been received with a location within the boundary of the control pad may cause the visual effect to be removed from the control pad.

In some embodiments, the control pad may no longer be displayed when the touch signal removed. In such embodiments, when a new touch signal is received within the partition, the control pad may be activated and displayed based at least in part on the location of the touch signal at block 404. In some embodiments, the control pad may continue to be displayed for a specified period of time after the touch signal has been removed, allowing a user to perform an action by tapping the control pad.

Thus, various embodiments provide a movable control pad for a touchscreen device. By allowing the control pad to follow the finger of the user, the user will be able to continue using the control pad even if the user's hands or fingers move slightly off the area of the screen with the control pad is displayed, allowing the user to play the game without having to constantly look away from the game to check the position of the user's hands. This allows the user to better focus on the actual game, increasing engagement and enjoyment.

Overview of Computing Device

Figure 5:
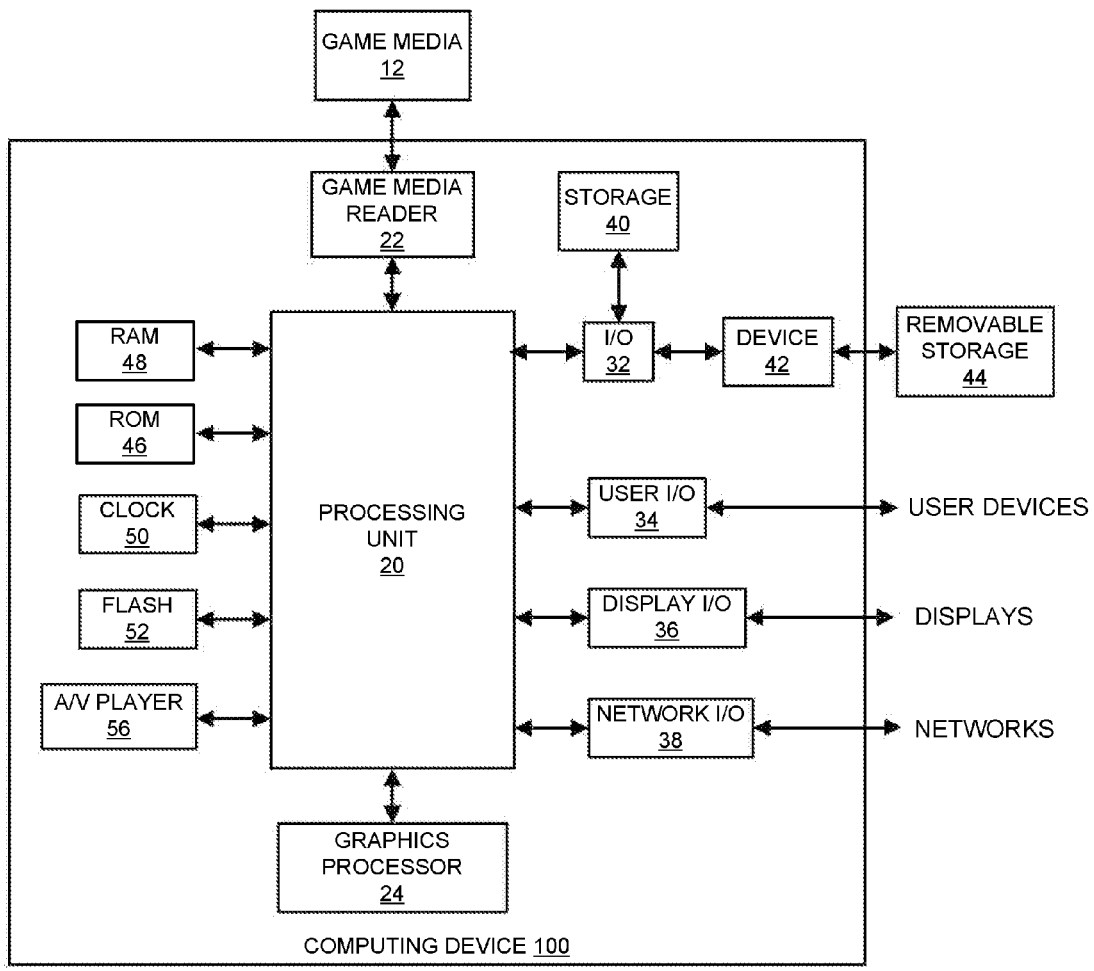
FIG. 5 illustrates an embodiment of a computing device.

FIG. 5 illustrates an embodiment of computing device 100 according to the present disclosure. Other variations of the computing device 100 may be substituted for the examples explicitly presented herein, such as removing or adding components to the game device. The computing device 100 may include a game device, a smart phone, a tablet, a personal computer, a laptop, a smart television, a car console display, and the like. As shown, the computing device 100 includes a processing unit 20 that interacts with other components of the computing device 100 and also external components to computing device 100. A game media reader 22 is included that communicates with game media 12. Game media reader 22 may be an optical disc reader capable of reading optical discs, such as CD-ROM or DVDs, or any other type of reader that can receive and read data from game media 12.

Computing device 100 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 100 may include a discrete graphics processor 24 that is separate from the processing unit 20. In some such cases, the graphics processor 24 may have separate RAM from the processing unit 20. Computing device 100 might be a handheld video game device, a dedicated game console computing system, a general-purpose laptop or desktop computer, a smart phone, a tablet, a car console, or other suitable system.

Computing device 100 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 100. Processing unit 20 can communicate through I/O 32 to store data, such as game state data and any shared data files. In addition to storage 40 and removable storage media 44, computing device 100 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals produced by display I/O 36 comprising signals for displaying visual content produced by computing device 100 on a display device, such as graphics, user interfaces, video, and/or other visual content. Computing device 100 may comprise one or more integrated displays configured to receive display output signals produced by display I/O 36. According to some embodiments, display output signals produced by display I/O 36 may also be output to one or more display devices external to computing device 100, such a display 16.

The computing device 100 can also include other features that may be used with a game, such as a clock 50, flash memory 52, and other components. An audio/video player 56 might also be used to play a video sequence, such as a movie. It should be understood that other components may be provided in computing device 100 and that a person skilled in the art will appreciate other variations of computing device 100.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the computing device 100 is turned off or loses power.

As computing device 100 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for implementing a control pad on a touchscreen, comprising:

by a hardware processor executing a game application,
receiving a first touch signal, the first touch signal indicating a first location on the touchscreen;
in response to the received first touch signal, causing the touchscreen to display a control pad in a first position, based at least in part on the first location, wherein the control pad comprises a control area on the touchscreen circumscribed by a boundary, and wherein the first location is within the control area;
receiving an indication of a movement of the first touch signal from the first location to a second location, wherein the second location is outside the boundary of the control pad;
in response to movement of the first touch signal from the first location to the second location:
causing the control pad to be updated from the first position on the touchscreen to a second position based, at least in part, on the second location of the first touch signal, such that the second location is within the boundary of the control pad; and
causing a manipulation to be performed in a game environment, based at least in part on the second location of the first touch signal relative to the second position of the control pad; and
receiving an indication that the first touch signal has been removed from the touchscreen;
receiving a second touch signal indicating a third location on the touchscreen;
determining if the third location is within the boundary of the control pad, wherein
in response to a determination that the third location is within the boundary of the control pad, causing a second manipulation to be performed in the game environment, based at least in part on the third location relative to the second position of the control pad, and in response to a determination that the third location is not within the boundary of the control pad, causing the control pad to be updated to a third position on the touchscreen, based, at least in part, on the third location, such that the third location is within the control area.

2. The computer-implemented method of claim 1, wherein the manipulation performed in the game environment is based at least in part on the second location of the first touch signal within the control area during the movement relative to the second position of the control pad.

3. The computer-implemented method of claim 1, wherein causing the control pad to be updated from the first position to the second position is based at least in part on a location of a point where the movement of the first touch signal intersects the boundary of the control pad.

4. The computer-implemented method of claim 1, further comprising causing a visual effect to be applied on the control pad in response to receiving the indication that the first touch signal has been removed from the touchscreen.

5. A computer-implemented method for implementing a control pad on a touchscreen, comprising:
by a hardware processor executing a game application,
receiving a first touch signal, the first touch signal indicating a first location on the touchscreen;
in response to the received first touch signal, causing the touchscreen to display a control pad in a first position, based at least in part on the first location, wherein the control pad comprises a control area on the touchscreen circumscribed by a boundary, and wherein the first location is within the control area;
receiving an indication of a movement of the first touch signal from the first location to a second location, wherein the second location is outside the boundary of the control pad;
in response to movement of the first touch signal from the first location to the second location:
causing the control pad to be updated from the first position on the touchscreen to a second position based, at least in part, on the second location of the first touch signal, such that the second location is within the boundary of the control pad; and
causing a manipulation to be performed in a game environment, based at least in part on the second location of the first touch signal relative to the second position of the control pad; and
receiving an indication that the first touch signal has been removed from the touchscreen;
causing the control pad to be removed from the touchscreen after receiving the indication that the first touch signal has been removed from the touchscreen;
receiving a second touch signal, the second touch signal indicating a third location on the touchscreen;
in response to receiving the second touch signal, causing the control pad to be re-displayed on the touchscreen, based at least in part on the third location, such that the third location is within the control area.

6. The computer-implemented method of claim 1, wherein the touchscreen comprises a first region and a second region, and wherein the control pad is displayed on the touchscreen in response to the received first touch signal only if the first location is within the first region.

7. A non-transitory computer readable medium comprising computer-executable instructions that, when executed by a computer, cause the computer to perform a method for implementing a control pad on a touchscreen, comprising:
receiving a first touch signal, the first touch signal indicating a first location on the touchscreen;
in response to the received first touch signal, causing the touchscreen to display a control pad in a first position, based at least in part on the first location, wherein the control pad comprises a control area on the touchscreen circumscribed by a boundary, and wherein the first location is within the control area;
receiving an indication of a movement of the first touch signal from the first location to a second location, wherein the second location is outside the boundary of the control pad;
in response to movement of the first touch signal from the first location to the second location:
causing the control pad to be updated from the first position on the touchscreen to a second position based, at least in part, on the second location of the first touch signal, such that the second location is within the boundary of the control pad; and
causing a manipulation to be performed in a game environment, based at least in part on the second location of the first touch signal relative to the second position of the control pad; and
receiving an indication that the first touch signal has been removed from the touchscreen;
causing the control pad to be removed from the touchscreen after receiving the indication that the first touch signal has been removed from the touchscreen;
receiving a second touch signal, the second touch signal indicating a third location on the touchscreen;
in response to receiving the second touch signal, causing the control pad to be re-displayed on the touchscreen, based at least in part on the third location, such that the third location is within the control area.

8. The non-transitory computer readable medium of claim 7, wherein the manipulation performed in the game environment is based at least in part on a location of the first touch signal within the control area during the movement relative to a designated point within the control pad.

9. The non-transitory computer readable medium of claim 7, wherein the update of the control pad is based at least in part on a location of a point where the movement of the first touch signal intersects the boundary of the control pad.

10. The non-transitory computer readable medium of claim 7, wherein the touchscreen comprises a first region and a second region, and wherein the control pad is displayed on the touchscreen in response to the received first touch signal only if the first location is within the first region.

11. A non-transitory computer readable medium comprising computer-executable instructions that, when executed by a computer, cause the computer to perform a method for implementing a control pad on a touchscreen, comprising:
receiving a first touch signal, the first touch signal indicating a first location on the touchscreen;
in response to the received first touch signal, causing the touchscreen to display a control pad in a first position, based at least in part on the first location, wherein the control pad comprises a control area on the touchscreen circumscribed by a boundary, and wherein the first location is within the control area;
receiving an indication of a movement of the first touch signal from the first location to a second location, wherein the second location is outside the boundary of the control pad;

in response to movement of the first touch signal from the first location to the second location:
    causing the control pad to be updated from the first position on the touchscreen to a second position based, at least in part, on the second location of the first touch signal, such that the second location is within the boundary of the control pad; and
    causing a manipulation to be performed in a game environment, based at least in part on the second location of the first touch signal relative to the second position of the control pad; and
receiving an indication that the first touch signal has been removed from the touchscreen;
receiving a second touch signal indicating a third location on the touchscreen;
determining if the third location is within the boundary of the control pad, wherein
    in response to a determination that the third location is within the boundary of the control pad, causing a second manipulation to be performed in the game environment, based at least in part on the third location relative to the second position of the control pad, and
    in response to a determination that the third location is not within the boundary of the control pad, causing the control pad to be updated to a third position on the touchscreen, based, at least in part, on the third location, such that the third location is within the control area.

12. The non-transitory computer readable medium of claim 11, further comprising causing a visual effect to be applied on the control pad in response to receiving the indication that the first touch signal has been removed from the touchscreen.

13. A system for implementing a control pad on a touchscreen, the system comprising:
    a first physical data store configured to store game environment information;
    a computing device comprising a touchscreen and in electronic communication with the first physical data store and configured to:
    receive a first touch signal, the first touch signal indicating a first location on the touchscreen;
    in response to the received first touch signal, cause the touchscreen to display a control pad in a first position, based at least in part on the first location, wherein the control pad comprises a control area on the touchscreen circumscribed by a boundary, and wherein the first location is within the control area;
    receive an indication of a movement of the first touch signal from the first location to a second location, wherein the second location is outside the boundary of the control pad;
    in response to movement of the first touch signal from the first location to the second location:
        cause the control pad to be updated from the first position on the touchscreen to a second position based, at least in part, on the second location of the first touch signal, such that the second location is within the boundary of the control pad; and
        cause a manipulation to be performed in a game environment, based at least in part on the second location of the first touch signal relative to the second position of the control pad; and
    receive an indication that the first touch signal has been removed from the touchscreen;
    receive a second touch signal indicating a third location on the touchscreen;
    determine if the third location is within the boundary of the control pad, wherein
        in response to a determination that the third location is within the boundary of the control pad, cause a second manipulation to be performed in the game environment, based at least in part on the third location relative to the second position of the control pad, and
        in response to a determination that the third location is not within the boundary of the control pad, cause the control pad to be updated to a third position on the touchscreen, based, at least in part, on the third location, such that the third location is within the control area.

14. The system of claim 13, wherein the manipulation performed in the game environment is based at least in part on a location of the first touch signal within the control area during the movement relative to a designated point within the control pad.

15. The system of claim 13, wherein the update of the control pad is based at least in part on a location of a point where the movement of the first touch signal intersects the boundary of the control pad.

16. The system of claim 13, the computing device being further configured to cause a visual effect to be applied on the control pad in response to receiving the indication that the first touch signal has been removed from the touchscreen.

17. A system for implementing a control pad on a touchscreen, the system comprising:
    a first physical data store configured to store game environment information;
    a computing device comprising a touchscreen and in electronic communication with the first physical data store and configured to:
    receive a first touch signal, the first touch signal indicating a first location on the touchscreen;
    in response to the received first touch signal, cause the touchscreen to display a control pad in a first position, based at least in part on the first location, wherein the control pad comprises a control area on the touchscreen circumscribed by a boundary, and wherein the first location is within the control area;
    receive an indication of a movement of the first touch signal from the first location to a second location, wherein the second location is outside the boundary of the control pad;
    in response to movement of the first touch signal from the first location to the second location:
        cause the control pad to be updated from the first position on the touchscreen to a second position based, at least in part, on the second location of the first touch signal, such that the second location is within the boundary of the control pad; and
        cause a manipulation to be performed in a game environment, based at least in part on the second location of the first touch signal relative to the second position of the control pad; and
    receive an indication that the first touch signal has been removed from the touchscreen;
    cause the control pad to be removed from the touchscreen after receiving the indication that the first touch signal has been removed from the touchscreen;
    receive a second touch signal, the second touch signal indicating a third location on the touchscreen;

in response to receiving the second touch signal, cause the control pad to be re-displayed on the touchscreen, based at least in part on the third location, such that the third location is within the control area.

\* \* \* \* \*